Nov. 10, 1925.
J. BELL
1,561,136
AUTO TRUCK STAKE HOLDER
Filed Jan. 22, 1925
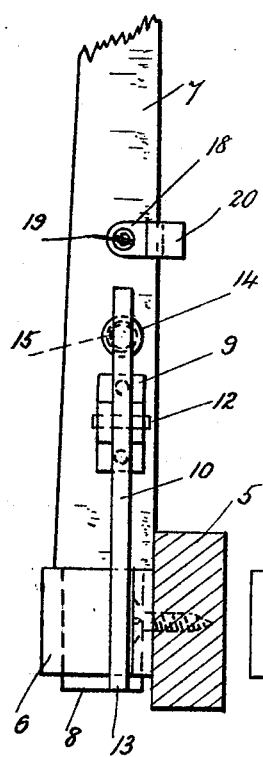
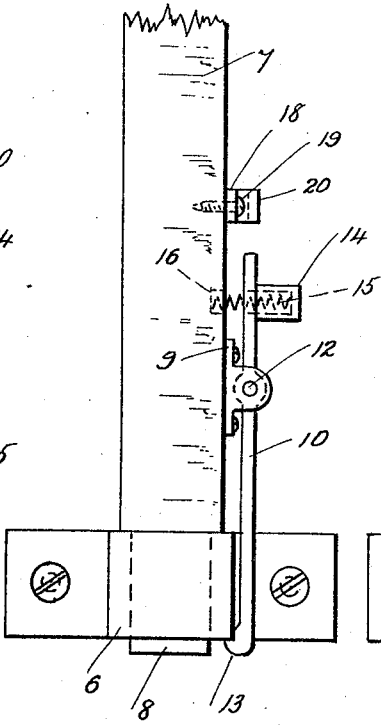
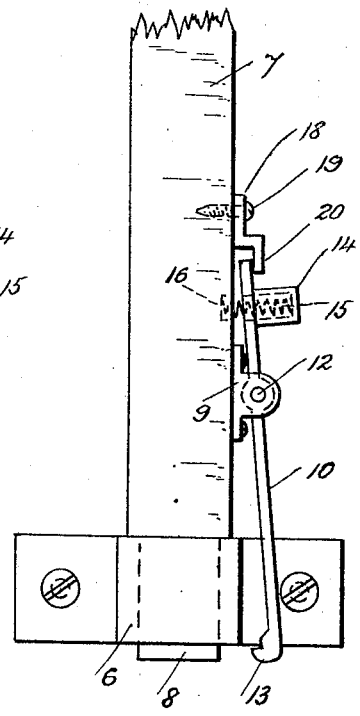
Inventor
James Bell
by Herbert W. Jenner,
Attorney.

Patented Nov. 10, 1925.

1,561,136

UNITED STATES PATENT OFFICE.

JAMES BELL, OF WEST MEDWAY, MASSACHUSETTS.

AUTO TRUCK STAKE HOLDER.

Application filed January 22, 1925. Serial No. 3,990.

*To all whom it may concern:*

Be it known that I, JAMES BELL, a citizen of the United States, residing at West Medway, in the county of Norfolk and State of Massachusetts, have invented certain new and useful Improvements in Auto Truck Stake Holders, of which the following is a specification.

This invention relates to the stakes used on auto trucks; and it consists of a spring-actuated catch lever which retains the stake in the stake socket and permits it to be removed and replaced with facility, said catch lever being constructed as hereinafter fully described and claimed.

In the drawings, Figure 1 is a side view of a portion of a truck stake and its socket provided with a catch lever according to this invention. Fig. 2 is a front view of the same. Fig. 3 is a front view, but shows the catch lever disconnected from the socket so that the stake can be removed and replaced.

A portion 5 of a truck body has a stake socket 6 secured to it, and the stake 7 is slidable vertically in this socket, being provided with a tenon 8 for engaging freely with the socket. A bracket 9 is secured to one side of the stake, and a catch lever 10 is pivoted to the bracket 9 by a pin 12. The lower end of the catch lever extends vertically below the socket and is provided with a lug or hook 13 which normally projects under the bottom edge of the socket.

A cup 14 is formed on the upper end portion of the lever; and 15 is a helical spring, one end of which is inserted in the cup. The other end of the spring is arranged in a recess 16 in the side of the stake, and the spring normally holds the lug or hook in engagement with the socket.

A retaining plate 18 is pivoted at its upper end portion to the stake by a pin 19, and the lower end portion 20 of the plate is offset from the stake, so that it can engage with the upper end portion of the catch lever when pressed against the side of the stake, as shown in Fig. 3, and the lug or hook is disengaged from the socket.

When this retaining catch is used, the tenon of the stake need not be fitted tightly in the socket, and the stake can be removed and replaced with great facility, which is sometimes desirable when the truck is used for different purposes. The catch also prevents the stake from jolting out of the socket and being lost.

What I claim is:

The combination, with a stake socket, and a stake slidable therein; of a catch lever pivotally supported by the stake and having a lug on its lower end for engaging with the stake socket, said lever having also a cup projecting laterally from its upper end portion on the opposite side thereof from the stake, a locking spring inclosed in the said cup and having a projecting end portion which bears on the stake, and a retaining plate pivoted to the stake above the upper end of the lever and having an offset portion for holding the lever when its lug is disengaged from the stake socket.

In testimony whereof I have affixed my signature.

JAMES BELL.